C. BULLOCK.
Harvester Rake.
No. 32,160. Patented April 23, 1861.
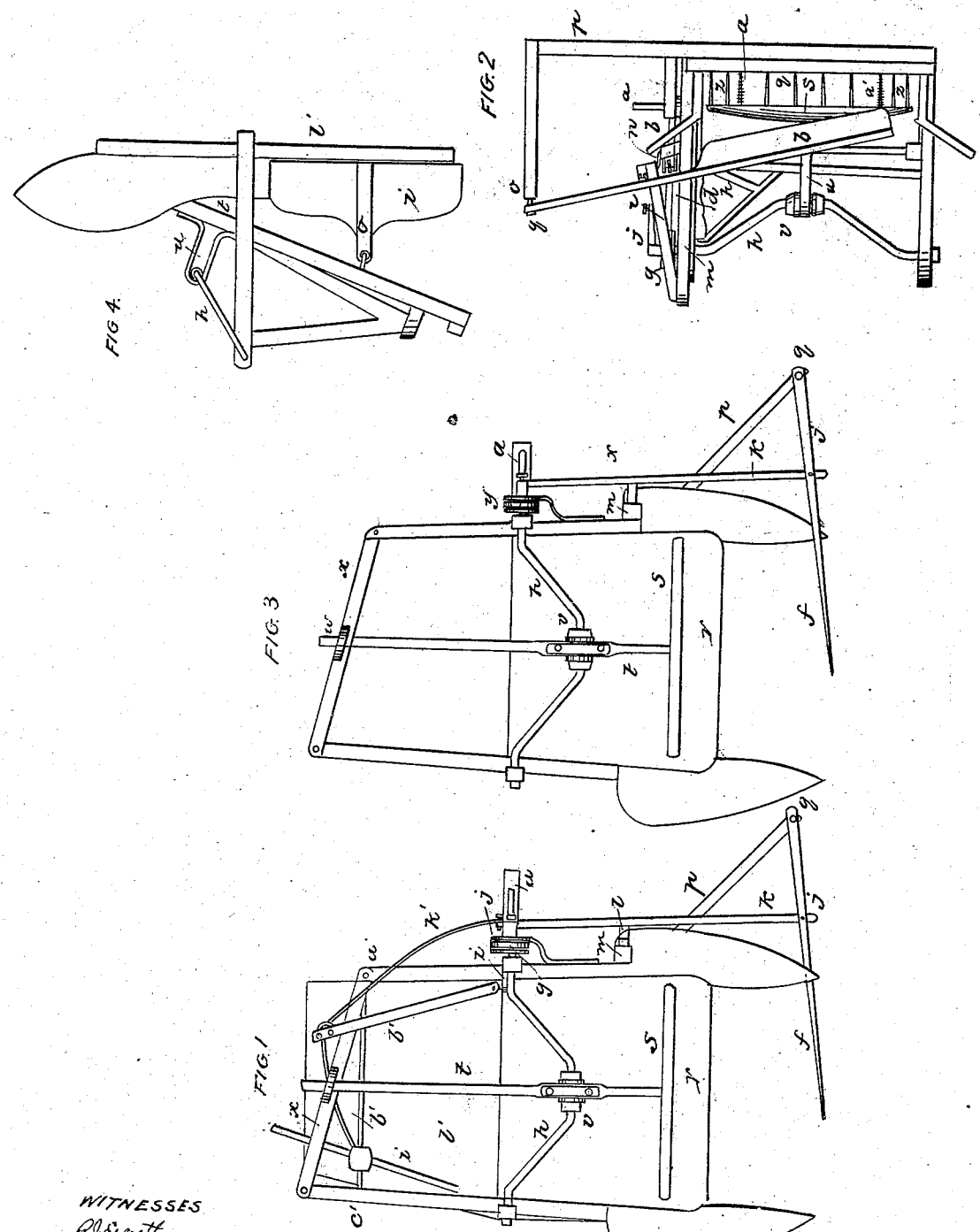

UNITED STATES PATENT OFFICE.

CHESTER BULLOCK, OF JAMESTOWN, NEW YORK, ASSIGNOR TO HIMSELF AND DE FOREST WELD, OF SAME PLACE.

IMPROVEMENT IN RAKES FOR HARVESTERS.

Specification forming part of Letters Patent No. 32,160, dated April 23, 1861.

*To all whom it may concern:*

Be it known that I, CHESTER BULLOCK, of Jamestown, in the county of Chautauque and State of New York, have invented a new and Improved Rake and Gathering Attachment for Harvesters; and I do hereby declare that the following is a full, clear, and exact description thereof, reference being had to the accompanying drawings, and to the letters and marks thereon.

My invention has reference to means for placing the cut grain, stalks, or grass upon a rake bed or table, to the delivery of the stalks by the rake as a rear delivery, or by the rake to a bed or table with a side delivery, which side delivery is so made and arranged that it may be detached when it is preferred to use a rear delivery.

My invention can be used in connection with and be attached to the rigid or to the flexible bar machines.

Of the drawings forming part of this specification, Figure 1 is a top view of my rake and gathering attachment, Fig. 2 being a front view of the same, Fig. 3 a top view without the side-delivery means, and Fig. 4 a side view showing more fully the side-delivery or cross-head rake.

In each of these figures where like parts are shown like letters and marks are used to indicate them.

A small shaft, $a$, upon which there is a pulley or toothed wheel, $b$, operated by power derived from the harvester, gives motion to the several parts of this machine. By a band, $d$, or chain, this power is communicated to a pulley or wheel, $e$, for operating the gathering-arm $f$, and to a pulley or wheel, $g$, for operating the rake-shaft $h$ and the cross-head rake $i$. If a band be used for transferring, the power pulleys or drums will be used in connection therewith, and if a chain be used, then toothed wheels will be needed, the teeth of the wheels fitting into the links of the chain.

The gathering arm or lever $f$, which is a substitute for the usual reel, is actuated just previous to the cutters, its further movement being coincident with the cutter-bar. Its fulcrum $q$ is on the upright or standard $o$, which rests upon the base-bar $p$. An oscillating arm, $k$, suspended by a bar, $l$, from standard $m$, is connected to the lever $f$ at $j$, the rear end of the oscillating arm being affixed to crank $n$, which is attached to the pulley $e$. By these means the lever $f$ has given to it the movements necessary to enable it to perform the function of carrying the cut stalks onto the rake platform or bed $r$.

The rake $s$, by its handle or stem $t$ and yoke $u$, is connected with the shaft $h$ of the pulley $g$. This shaft $h$, as is shown by the drawings, is shaped somewhat like the letter V, and has upon it at its center a friction-roller, $v$, which friction-roller is embraced by the yoke $u$, and in the backward and forward motion of the rake the friction-roller plays through the entire slot or space of the yoke. The peculiar form of the shaft $h$ gives in its rotation the entire motions of the rake, in which motions the handle or stem $t$ is guided by an eye or slotted stud, $w$, upon a cross-bar, $x$, on the rear part of the frame of the machine. A scraping-bar, $y$, is attached to rake $s$ by means of rods $z$, upon which this bar plays. The object of this bar is to carry off from the bed or table $r$ any stalks which the teeth of the rake might miss. The bar may be left to keep its place by its own weight; or springs $a'$ may be used for that purpose.

The cross-head rake $i$ in its motions traverses upon a rod, $b'$, extending across the rear of the machine from bar $c'$ to bar $d'$ of the machine's frame. By a hinged rod, $e'$, this rake $i$ is connected to a crane $f'$, the arms $g'$ and $h'$ of which are hinged to standard $i'$ of the frame. The motions of the rake $i$ are derived from the crank $j'$, affixed to pulley $g$, by the interposition of the spring-bar $k$ between the crank and the outer end of the crane, the spring-bar bending or yielding in its movements, and thus accommodating itself to the motions of the crank in conveying the power for operating the rake $i$. It will be seen that this cross-head or side-delivery rake $i$ may readily be detached from the frame of the machine whenever it is preferred to use the rear delivery. The bed or table $l'$ of the side delivery may be connected to the bed $r$ by hinges, pins fitting into holes or grooves, or by any means which will allow of its ready removal.

This brief recital of the construction and operation of my invention, in connection with the drawings, shows how the gatherer or arm $f$, the rake $s$, and the cross-head rake $i$ will have the proper respective and continued action derived from a common power to gather the cut stalks on the bed, and to have them carried to a rear or to a side delivery in perfect and good condition.

What I claim, and desire to secure by Letters Patent, is—

1. The scraping-bar $y$, attached to the rake $s$, as and for the purposes set forth.

2. The reciprocating rear-delivery rake and the detachable reciprocating side-delivery rake, operating in combination, in the manner substantially as and for the purpose described.

3. The spring-bar connection between the cross-head rake $i$ and the crank $j'$, arranged and operated as set forth.

This specification signed this 7th day of February, 1861.

CHESTER BULLOCK.

Witnesses:
 T. T. EVERETT,
 F. S. MYER.